Oct. 30, 1923. Re. 15,705

M. M. GLASSE

FAN

Original Filed Oct. 11, 1919 3 Sheets-Sheet 1

WITNESSES

Lawrence O. Mauk

E. B. Fine

INVENTOR

M. M. Glasser,

BY Munn & Co.

ATTORNEYS

Oct. 30, 1923. Re. 15,705

M. M. GLASSER

FAN

Original Filed Oct. 11, 1919 3 Sheets-Sheet 2

WITNESSES

Lawrence D. Manford

E. D. Frutt

INVENTOR

M. M. Glasser,

BY

Munn & Co

ATTORNEYS

Oct. 30, 1923. Re. 15,705

M. M. GLASSER

FAN

Original Filed Oct. 11, 1919 3 Sheets-Sheet 3

WITNESSES

Lawrence D. Manker

C. D. Frau.

INVENTOR

M. M. Glasser,

BY

Munn & Co.

ATTORNEYS

Reissued Oct. 30, 1923. Re. 15,705

UNITED STATES PATENT OFFICE.

MAURICE M. GLASSER, OF CHARLESTON, SOUTH CAROLINA.

FANS.

Original No. 1,354,098, dated September 28, 1920, Serial No. 329,960, filed October 11, 1919. Application for reissue filed August 16, 1921. Serial No. 492,851.

*To all whom it may concern:*

Be it known that I, MAURICE M. GLASSER, a citizen of the United States, and a resident of Charleston, in the county of Charleston and State of South Carolina, have invented certain new and useful Improvements in Fans, of which the following is a specification.

My invention relates to motor operated fans and particularly, although not necessarily, to ceiling fans, a purpose of my invention being the provision of a fan having means by which it is caused to continuously oscillate through a fixed arc and at the same time bodily rotated so that the path of the arc continuously changes to effect a diffusion of the air current produced by the fan over a greater and constantly changing area.

I will describe one form of fan embodying my invention and will then point out the novel features thereof in the claims.

Figure 1:
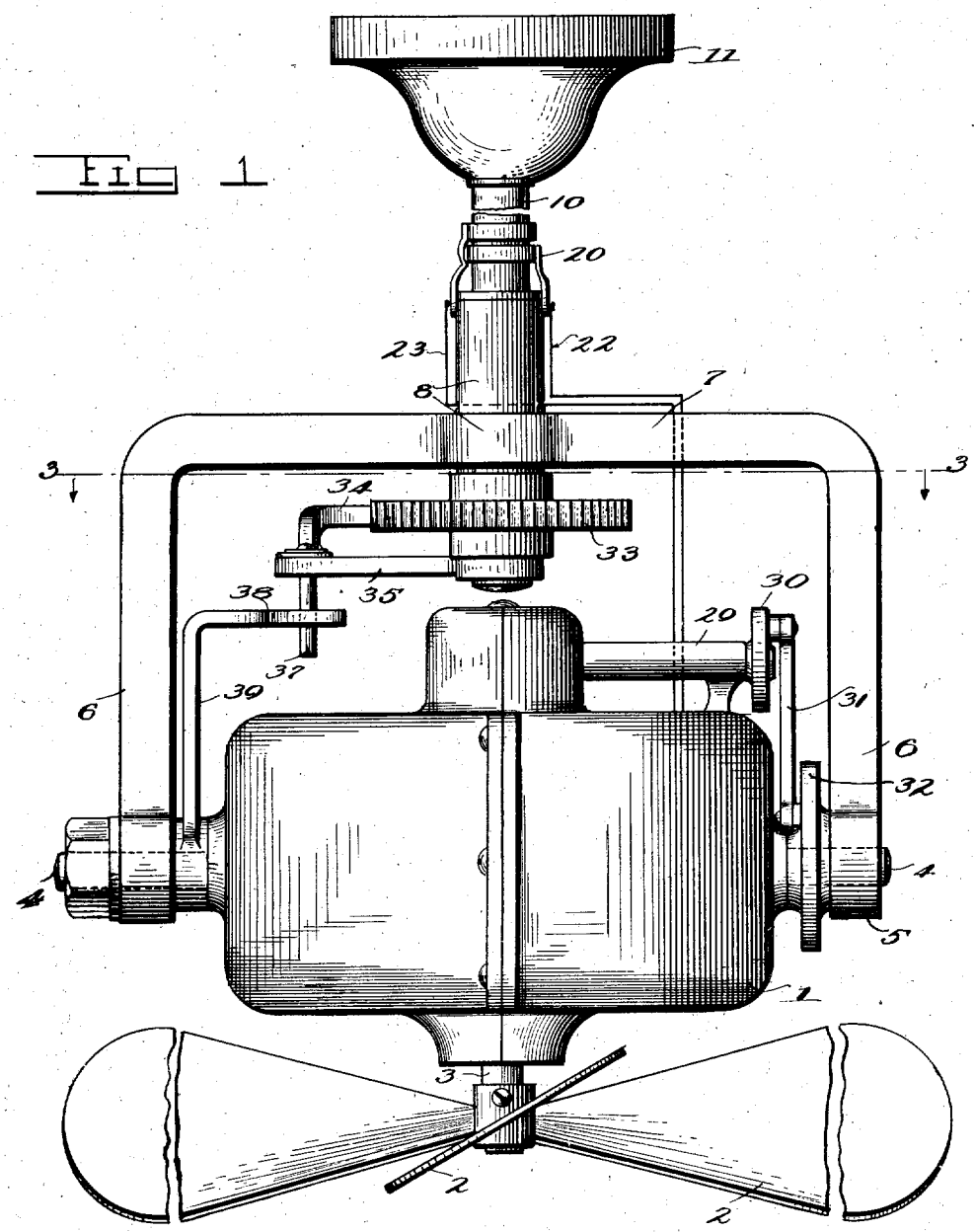
Figure 1 is a front view of a fan provided with the improved oscillator.
Figure 2:
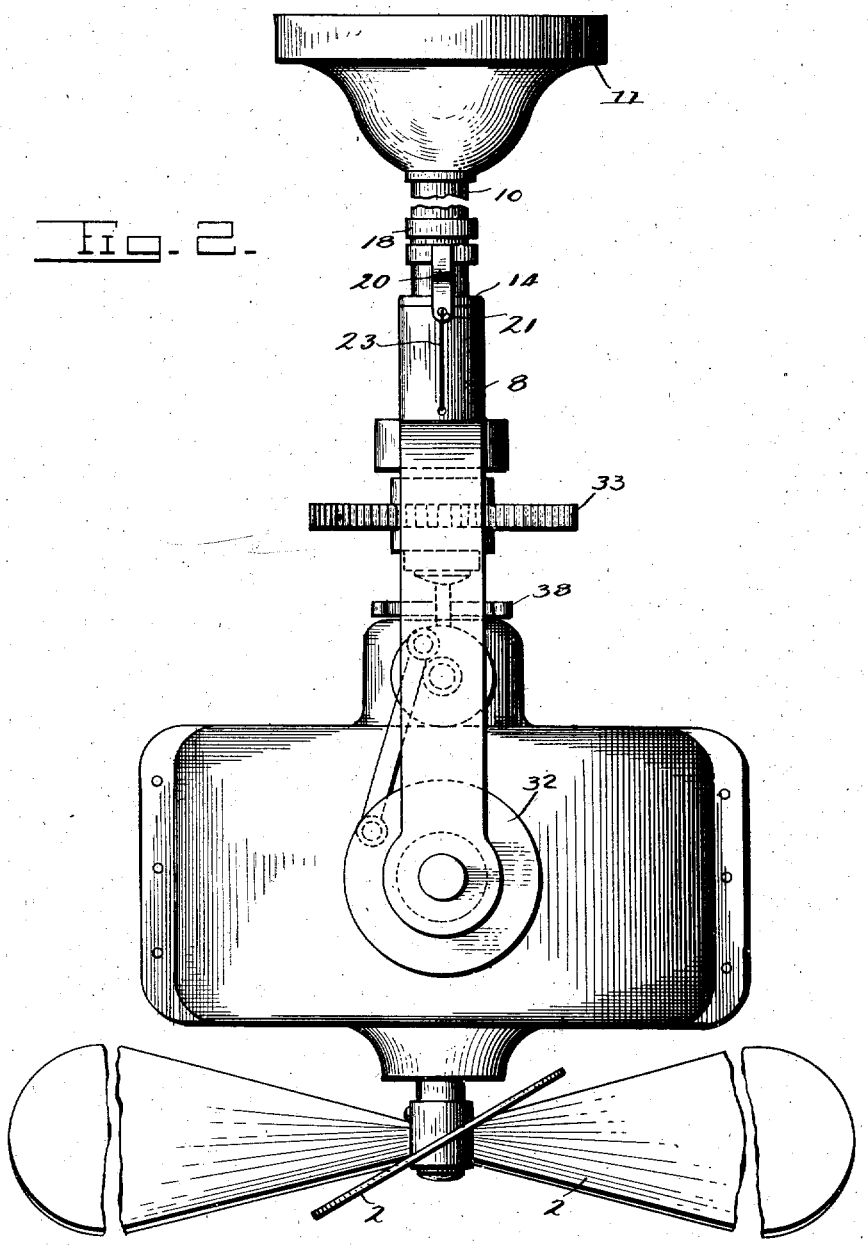
Figure 2 is a view at right angles to Figure 1.
Figure 3:
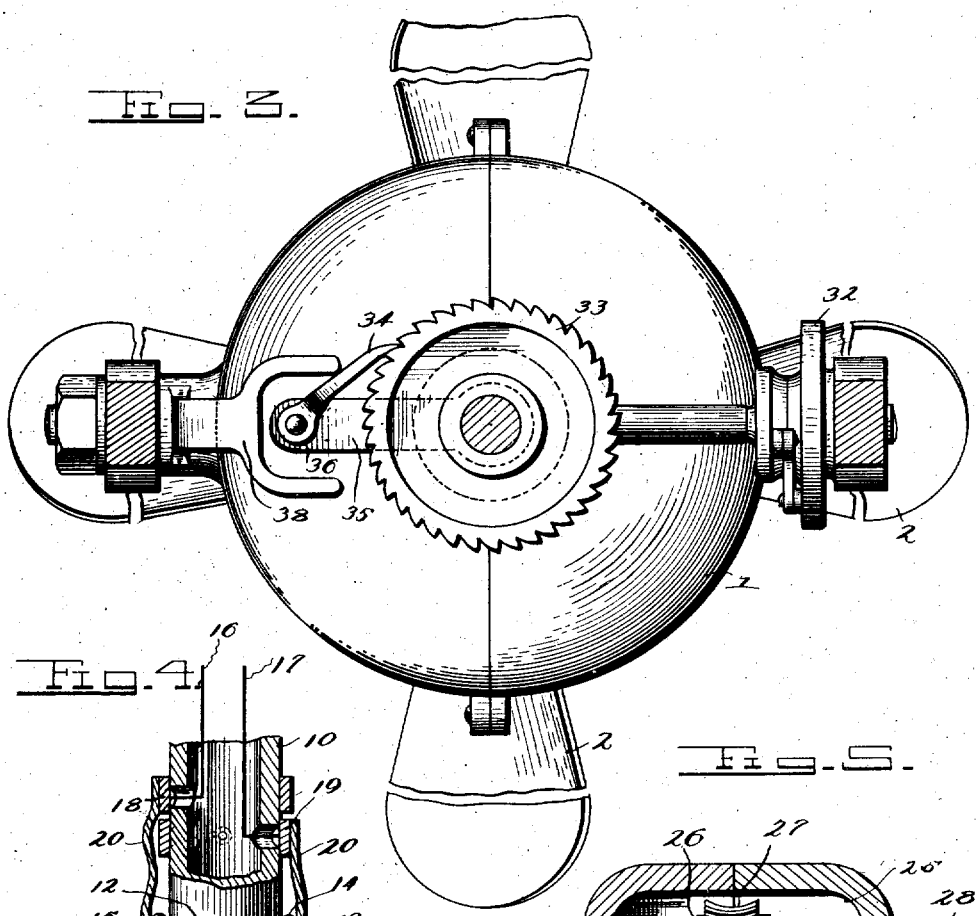
Figure 3 is a section on the line 3—3 of Figure 1.

The present embodiment of the invention is shown in connection with a fan composed of a suitable motor arranged within the casing 1, the fan 2 being mounted upon the motor shaft 3. This motor casing 1 has oppositely extending journal pins 4, which are journaled in bearings 5 in the arms 6 of a yoke whose body 7 has at its center an upstanding sleeve 8. Within this sleeve there is journaled the lower end of a hollow post 10 which has a base 11 capable of being secured to the ceiling or other fixed support.

Figure 4:
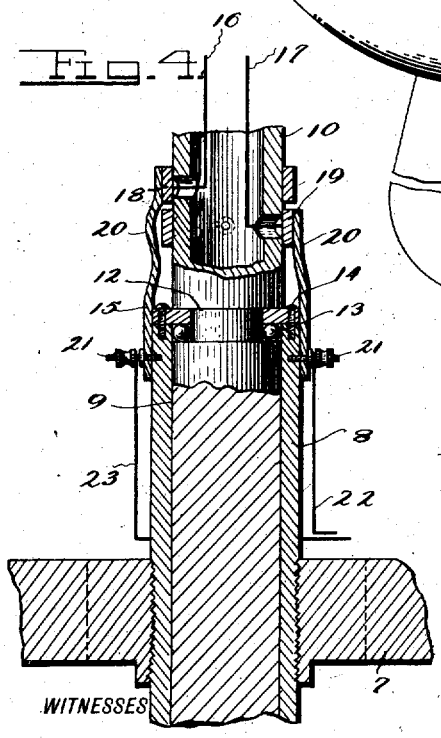
Figure 4 is a vertical section through the fan mounting.
Figure 5:
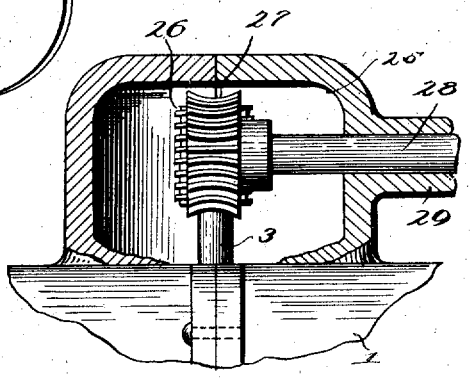
Figure 5 is a similar view of the connection between the fan mounting and the oscillator.

As shown more particularly in Figure 4 the post 10 is annularly grooved intermediate its ends as shown at 12, and a ball bearing 13 is arranged between the shoulder formed at the lower end of the groove and a washer 14 which is connected to the upper end of the sleeve 8 by screws 15 or the like. The sleeve 8 is rotatable on the hollow post 10, and the yoke and sleeve are supported by the post, by means of the ball bearing 13.

The conductors 16 and 17 which carry the current to the motor in the case 1 are connected with rings 18 and 19, respectively, which are held on the lower end of the post, the post having openings, as shown in Figure 4 through which the conductors extend to their connection with the rings, it being understood that the said rings are insulated from the post and from each other.

Brushes 20 are secured to the sleeve 8 at opposite sides thereof by means of binding posts 21, and conductors 22 and 23 lead from the binding posts to the connections of the motor. The brushes, during the rotation of the yoke, move in contact with the rings 18 and 19, completing the circuit whatever the movement of the yoke 6—7—8.

In order to oscillate the motor casing on the journal pins 4 the upper end of the motor shaft 3 extends into an auxiliary casing 25 at the top of the motor casing 1. Within this casing the shaft has a worm 26 which actuates a worm gear 27 upon a horizontal shaft 28 journaled in the auxiliary casing and in an extension 29 from the said auxiliary casing. The outer end of this shaft carries a disk 30 and a link 31 connects this disk with a fixed disk 32 supported by the adjacent arm of the yoke 6—7, the link being connected eccentrically to both disks. The arrangement is such that when the fan is rotating the shaft 28 will be driven and because the disk 32 is fixed the motor casing and the fan will be oscillated through an arc of approximately 30°. With this arrangement the blast from the fan would sweep across the floor, for instance, in a straight line in one direction. However, I provide mechanism continuously changing the direction of this line so that the blast from the fan will sweep over many lines, the said mechanism continuously rotating the yoke 7 on the hollow post 10 in one direction.

The said mechanism comprises a ratchet wheel 33 rigid with the lower end of the hollow post 10, and a pawl 34 pivoted on an arm 35 extending radially from the lower end of the hollow post. The arm is loosely journaled on the post to swing with respect thereto, and the pawl is normally pressed into engagement with the ratchet wheel by a spring 36. This arm 35 also carries a depending pin 37 which fits between the arms of a fork 38 on the upper end of an arm 39 extending radially upward from one of the journal pins 4 and rigid with the motor casing. The arrangement is such that when the motor casing oscillates the arms of the fork will move the pin in opposite directions. In one direction the pawl 34 will slip idly over the teeth of the ratchet wheel, while in the other direction the pawl will engage the ratchet teeth, imparting intermittent movement to the yoke 6—7.

In operation, as the fan rotates, the motor casing will be oscillated, swinging on the journal pins 4, that is swinging on a horizontal axis when the fan is mounted on the ceiling. At each complete swing or oscillation of the motor casing the yoke will be turned about the axis of the hollow post 10 through a predetermined arc, so that each sweep or oscillation of the fan will have a different angle. Thus the sweeps or oscillations of the fan will rotate about a fixed center, namely, the axis of the post 10.

Although I have herein shown and described only one form of fan embodying my invention, it is to be understood that various changes and modifications can be made herein without departing from the scope of the invention and the scope and spirit of the appended claims.

I claim:—

1. In an electric fan, the combination with the motor casing, of a yoke comprising a body and arms having bearings, the motor casing having journal pins journaled in the bearings, a connection between the fan and the yoke for oscillating the motor casing on the journal pins when the fan is rotated, a sleeve extending transversely of the body of the yoke at the center thereof, a post for supporting the fan on which the sleeve is journaled, a ratchet wheel secured to the lower end of the post, an arm pivoted to the post below the ratchet wheel, a pawl carried by the arm and engaging the wheel, said arm having a depending pin, and a fork carried by the motor casing, the pin engaging between the arms of the fork.

2. In an electric fan, the combination with the motor casing, of a yoke comprising a body and arms having bearings, the motor casing having journal pins journaled in the bearings, a connection between the fan and the yoke for oscillating the motor casing on the journal pins when the fan is rotated, a sleeve extending transversely of the body of the yoke at the center thereof, a post for supporting the fan on which the sleeve is journaled, a ratchet wheel secured to the lower end of the post, and means controlled by the oscillation of the motor casing for intermittently advancing the yoke in the same direction.

3. In an electric fan, the combination with the motor casing, of a yoke comprising a body and arms having bearings, the motor casing having journal pins journaled in the bearings, a connection between the fan and the yoke for oscillating the motor casing on the journal pins when the fan is rotated, a support for the fan with which the body of the yoke is rotatably connected to rotate on an axis at right angles to the axis of oscillation of the motor casing, means controlled by the oscillation of the motor casing for intermittently rotating the yoke on its support, said means comprising a ratchet wheel supported by the fan support, an arm pivoted at the axis of the ratchet wheel and carrying a pawl engaging the wheel, the motor casing carrying a fork and the arm having a pin engaging between the arms of the fork.

4. In an electric fan, the combination with the motor casing, of a yoke comprising a body and arms having bearings, the motor casing having journal pins journaled in the bearings, a connection between the fan and the yoke for oscillating the motor casing on the journal pins when the fan is rotated, a support for the fan with which the body of the yoke is rotatably connected to rotate on an axis at right angles to the axis of the oscillation of the motor casing, and means controlled by the oscillation of the motor casing for intermittently rotating the yoke on its support.

5. In an electric fan, a yoke comprising a body mounted to rotate at its center on an axis perpendicular to the body, and having arms, the motor casing of the fan being journaled between the arms to swing on an axis at right angles to that of the yoke's rotation, means controlled by the rotation of the fan for oscillating the motor casing with respect to the yoke, and means controlled by the oscillation of the motor casing for intermittently rotating the yoke on its axis in the same direction.

6. In an electric fan, a yoke for supporting the motor casing of the fan, a support for the yoke with which the yoke is connected to rotate on an axis coinciding with the axis of rotation of the fan, a connection between the yoke and the motor casing for oscillating the casing on the yoke when the fan is turning, a connection between the motor casing and the yoke for intermittently rotating the yoke on the support when the motor casing is oscillated, said support having rings of conducting material connected with the terminals of the circuit for the fan, and brushes connected with the terminals of the motor and engaging the rings.

7. In an electric fan, a yoke comprising a body and arms, the yoke being mounted to rotate at its center on an axis perpendicular to the body, the fan having a motor casing journaled between the arms of the yoke to swing on an axis at right angles to that of the yoke's rotation and means adapted to be actuated by the swinging motor casing to intermittently move the yoke about its axis.

8. A fan comprising a support having a fixed axis, a motor pivoted on the support, means for oscillating the motor in the support, the axis of the motor extending in the same direction as the fixed axis, and means independent of said motor oscillating means for bodily rotating the motor about the fixed axis.

9. A fan comprising a fan wheel, and supporting and driving means therefor, said supporting and driving means including a device operating to bodily oscillate the fan wheel in one plane and a second device adapted to be actuated upon oscillation of the fan wheel to bodily rotate the same in another plane.

10. A fan comprising a fan wheel, a motor for supporting and driving the fan wheel, mounted for oscillation about a horizontal axis and for rotation about a vertical axis, and mechanism operating to oscillate the motor about the horizontal axis and acting through mechanical connections to simultaneously rotate the motor about the vertical axis.

11. A fan comprising in combination a fan wheel, supporting and driving means therefor, said driving means bodily rotating the fan wheel intermittently about one axis through mechanical connections and simultaneously oscillating the same bodily about another axis which intersects the first axis.

12. A fan comprising a yoke mounted for rotation about a fixed axis, a motor body pivoted on the yoke and on an axis intersecting the yoke axis, means operably connected with the yoke for oscillating the motor body about the second axis, and means operated by the oscillating motor body to rotate the yoke.

13. A fan comprising a yoke mounted for rotation about a fixed axis, a motor body pivoted on the yoke and on an axis intersecting the yoke axis, means for oscillating the motor body about the second axis, and means operated by the oscillating motor body to intermittently rotate the yoke about its axis.

14. A fan comprising a yoke mounted for rotation about a fixed axis, a motor including a body pivoted on the yoke and on an axis intersecting the yoke axis, and means operable by the motor for oscillating the motor about the second axis and for positively acting on the motor to rotate the same about the first axis.

MAURICE M. GLASSER.